(No Model.)
F. WESSEL.
EAR STUD.
No. 363,030. Patented May 17, 1887.
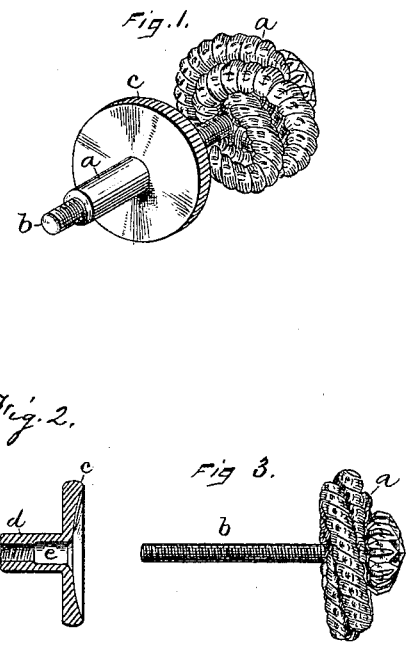
Witnesses.
John Edwards Jr.
H. H. Whiting.
Inventor.
Frederick Wessel.
By James Shepard
Atty.

UNITED STATES PATENT OFFICE.

FREDERICK WESSEL, OF NEW BRITAIN, CONNECTICUT.

EAR-STUD.

SPECIFICATION forming part of Letters Patent No. 363,030, dated May 17, 1887.

Application filed February 8, 1886. Serial No. 191,137. (No model.)

*To all whom it may concern:*

Be it known that I, FREDERICK WESSEL, a citizen of the United States, residing at New Britain, in the county of Hartford and State of Connecticut, have invented certain new and useful Improvements in Ear-Studs, of which the following is a specification.

My invention relates to improvements in ear-studs of the class in which the shank of the stud is screw-threaded, and is held in place by a nut; and the objects of my invention are to facilitate the entry of the threaded shank within the nut, and to so enter it therein that the shank and nut will be in proper alignment before the threads can be engaged.

In the accompanying drawings, Figure 1 is a perspective view of an ear-stud which embodies my invention. Fig. 2 is a sectional view of the nut for my stud, and Fig. 3 is a side elevation of the stud as detached from the nut. All of these figures are on an enlarged scale.

The head or front $a$ of the stud and its screw-threaded shank $b$ are of ordinary construction. I form the nut first of a disk, $c$, having its front face hollowed out, as shown in Fig. 2, while at the rear side of this disk there is a central hub, $d$. The rear end of this hub is bored and threaded to fit the thread of the shank $b$. In front of the threaded portion of the nut there is a plain cylindrical bore, $e$, the front end of which is countersunk, and opens into the hollow front face of the disk $c$. The size of the smooth bore $e$ is such as will readily admit the end of the screw-threaded shank $b$.

Heretofore the nuts of this class of studs have generally been simply a flat disk with a threaded hole.

The drawing of a prior patent for an ear-ring shows the centrally-threaded hole as countersunk, and a disk surrounding said hole as having a flat face, while the specification of the same patent describes said disk as "preferably made slightly convex." Such an earing is hereby disclaimed.

Inasmuch as these studs are worn in a position where the wearer cannot see them when attaching them, considerable inconvenience has been experienced in entering the screw-shank within the nut, and oftentimes the nut is not put on squarely, so that the thread is ruined.

By my improvement the shank is readily entered within the nut, for if the end of the shank strikes anywhere within the hollow face of the disk and the nut and shank are pressed toward each other the shank slides along said hollow face into the central opening, $e$. The end of the shank is then slipped directly into the nut to the whole depth of the cylindrical smooth bore $e$, so that the nut is held in axial line with the shank before entering said shank into the threaded portion of the nut, so that it is impossible for the nut to be screwed upon the shank when its face is not squarely in position. Thus it will be seen that the nut is much more conveniently attached than heretofore, and without any danger of damage.

I claim as my invention—

The herein-described ear-stud having the screw-threaded shank $b$, in combination with the nut, which consists of the hollow-faced disk $c$, and hub $d$, threaded at its rear end to fit the shank, and having between its threaded portion and hollow face of said disk the smooth cylindrical bore $e$, which opens into said hollow front face, substantially as described, and for the purpose specified.

FREDERICK WESSEL.

Witnesses:
 JAMES SHEPARD,
 JOHN EDWARDS, Jr.